United States Patent [19]
El-Ibiary

[11] Patent Number: 5,844,501
[45] Date of Patent: *Dec. 1, 1998

[54] SPEED REDUCER INCLUDING TEMPERATURE SENSING DEVICE

[75] Inventor: Yehia El-Ibiary, Simpsonville, S.C.

[73] Assignee: Reliance Electric Industrial Company, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 620,839

[22] Filed: Mar. 18, 1996

[51] Int. Cl.$^6$ .................................................. G08C 19/04
[52] U.S. Cl. ............................... 340/870.17; 340/870.17; 364/551.01
[58] Field of Search ............................. 340/870.17, 449, 340/439, 870.11, 870.16; 73/295; 364/551.01; 384/448; 374/141; 376/245

[56] References Cited

U.S. PATENT DOCUMENTS

| | | | |
|---|---|---|---|
| 3,969,941 | 7/1976 | Rapp | 73/299 |
| 4,488,140 | 12/1984 | Lang | 340/510 |
| 5,189,611 | 2/1993 | Petzold | 364/424.1 |
| 5,205,172 | 4/1993 | Doak | 73/295 |
| 5,210,704 | 5/1993 | Husseiny | 364/551.01 |
| 5,433,525 | 7/1995 | El-Ibiary . | |
| 5,439,296 | 8/1995 | El-Ibiary . | |
| 5,485,491 | 1/1996 | Salnick | 376/245 |
| 5,526,112 | 6/1996 | Sahagen | 356/72 |
| 5,559,494 | 9/1996 | Thompson | 340/439 |
| 5,581,464 | 12/1996 | Woll | 364/424.04 |
| 5,581,648 | 12/1996 | Sahagen | 385/125 |

FOREIGN PATENT DOCUMENTS 285521   3/1990   Japan .

*Primary Examiner*—Michael Horabik
*Assistant Examiner*—Albert K. Wong
*Attorney, Agent, or Firm*—Craig N. Killen; John M. Miller; John J. Horn

[57] ABSTRACT

An improved speed reducer having a temperature sensing device electrically connectible to an external monitoring device. The temperature sensing device is supported by the speed reducer housing and extends at least partially into the speed reducer interior area to a predetermined location. The predetermined location is below a minimum lubricant supply level within the speed reducer interior. The temperature sensing device is responsive to the temperature of the lubricant fluid within the speed reducer and is configured to communicate information indicative thereof to an external monitoring device, which may include an alarm or a downstream processing device.

21 Claims, 5 Drawing Sheets

SPEED REDUCER INCLUDING TEMPERATURE SENSING DEVICE

BACKGROUND OF THE INVENTION

The present invention relates to a system for monitoring status information regarding the operation of speed reducers or the like.

The various types of machinery generally found in an industrial setting will often utilize many bearings, speed reducers or other such mechanical components. For example, a single conveyor will frequently be equipped with multiple pillow block or flange bearings to support its various rotatable shafts. Speed reducers or other gear boxes may be utilized to transmit mechanical power to the machinery from a suitable prime mover.

The status of these mechanical components is often monitored during operation to determine when some form of corrective action should be taken. For example, the temperature of a bearing can be monitored to lessen the occurrence of overheating. It is also frequently desirable to monitor the rotational speed of the shaft to which the bearing is attached, as well as the extent to which the bearing housing is experiencing undesirable vibration. To facilitate such monitoring, each mechanical component may be equipped with a plurality of sensors.

The signal information provided by the various sensors of many mechanical components may be processed at a central monitoring controller. In the past, however, dedicated transmission lines have typically been provided for each of these sensors. As a result, several transmission lines would generally extend between each of the mechanical components and the central monitoring facility.

Due to the number of mechanical components in a typical industrial facility, the number of transmission lines carrying signal information to the central monitoring controller can become quite large. Thus, it will be appreciated that this type of arrangement will often be complex and cumbersome.

Furthermore, conventional systems generally do not monitor the temperature of speed reducers. Speed reducers may be important components in some systems and may be subject to overheating.

SUMMARY OF THE INVENTION

The present invention recognizes and addresses the foregoing disadvantages, and others, of prior art constructions and methods. Accordingly, it is an object of the present invention to provide an improved speed reducer apparatus.

It is a more particular object of the present invention to provide an improved speed reducer having means capable of determining a temperature of lubricant fluid therein.

It is a more particular object of the present invention to provide an improved speed reducer apparatus that may be incorporated into a mechanical component monitoring system.

Some of these objects are achieved by an improved speed reducer constructed according to the invention. The speed reducer preferably comprises a housing rotatably supporting an input shaft and an output shaft mechanically interconnected to transfer mechanical power therebetween. The housing defines an interior area for containing a lubricant fluid to at least a minimum lubricant supply level when the speed reducer is in an upright position.

The speed reducer comprises a temperature sensing device electrically connectible to an external monitoring device. The temperature sensing device is supported by the housing and extends at least partially into the interior area to a predetermined location. The predetermined location is below the minimum lubricant supply level. The temperature sensing device is responsive to temperature of the lubricant fluid and is configured to communicate information indicative thereof to the external monitoring device.

In presently preferred embodiments, the temperature sensing device is configured to detect when the lubricant fluid reaches a predetermined temperature. The device includes a casing extending through the housing in sealing engagement therewith. An appropriate temperature sensing element, such as a switch or a thermocouple, is embedded in the casing such that the temperature of the lubricant fluid may be detected.

In other preferred embodiments, the speed reducer includes the external monitoring device, for example a local transmitter having an output port. The local transmitter is in electrical communication with the temperature sensing device to receive information indicative of the temperature of the lubricant fluid. The local transmitter subsequently provides status information at its output port in a predetermined format. The status information at least in part corresponds to the temperature information. The speed reducer may also be provided with other sensors which provide further information to the local transmitter.

Other objects, features and aspects of the present invention are provided by various combinations and subcombinations of the disclosed elements, which are discussed in greater detail below.

BRIEF DESCRIPTION OF THE DRAWINGS

A full and enabling disclosure of the present invention, including the best mode thereof, to one of ordinary skill in the art is set forth more particularly in the remainder of the specification, including reference to the accompanying drawings, in which.

Figure 1:
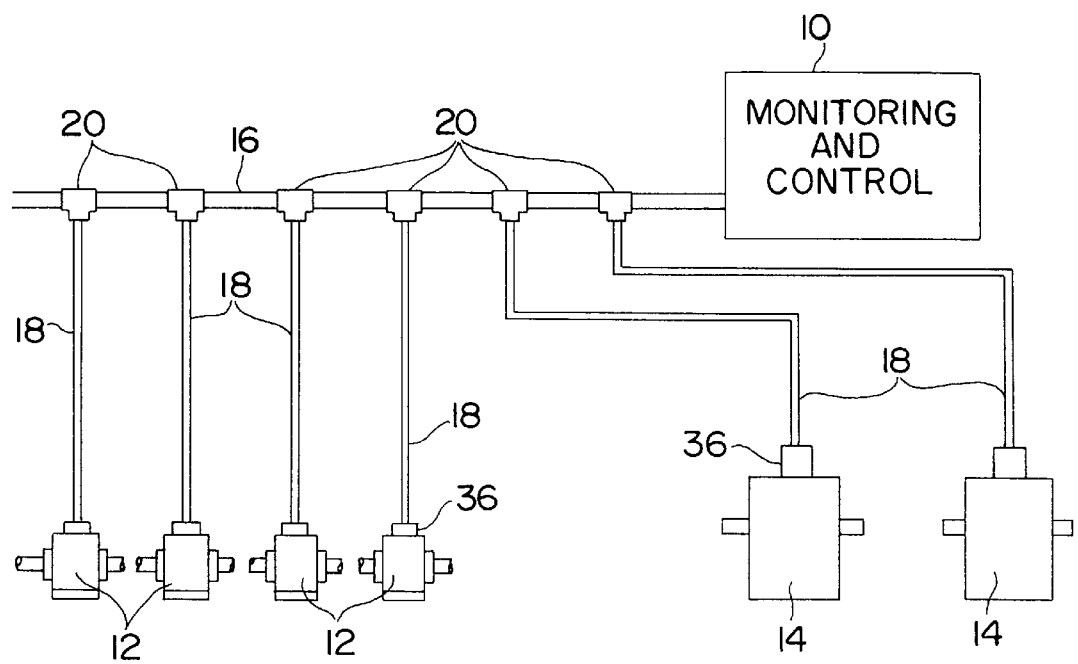
FIG. 1 is a diagrammatic representation of a mechanical component monitoring system utilizing an improved speed reducer constructed in accordance with the invention.

Repeat use of reference characters in the present specification and drawings is intended to represent same or analogous features or elements of the invention.

DETAILED DESCRIPTION OF PREFERRED EMBODIMENTS

It is to be understood by one of ordinary skill in the art that the present discussion is a description of exemplary embodiments only, and is not intended as limiting broader aspects of the present invention, which broader aspects are embodied in the exemplary constructions.

An exemplary embodiment of a mechanical component monitoring system is diagrammatically illustrated in FIG. 1. As can be seen, the system includes a processor 10 which provides monitoring and control functions for an indeterminate number of mechanical components. For example, processor 10 may utilize information received from the respective mechanical components to provide diagnostic information. This diagnostic information can be obtained using such techniques as Fast Fourier Transform (FFT), trend line analysis or other suitable analysis techniques.

The mechanical components utilized in the monitoring system may include, for example, bearing assemblies 12 and speed reducers 14. Bearings 12 and speed reducers 14 each include one or more sensor devices in electrical communication with a respective local transmitter. The local transmitter provides status information regarding operation of the associated mechanical component to processor 10 in a predetermined format. In presently preferred embodiments, such information is transmitted to processor 10 as a serial digital word, in which portions of the word may be dedicated to information received from specific sensors.

Preferably, each of the local transmitters has a unique electronic identifier, or "address." As such, processor 10 may "interrogate" a particular local transmitter using this unique identifier. When interrogated in this manner, the local transmitter may responsively provide status information regarding the associated mechanical component. Preferably, processor 10 will interrogate the various local transmitters of the system according to a predetermined sequence.

In the illustrated embodiment, electrical communication between the local transmitters and processor 10 is accomplished utilizing a bus structure having a main trunk 16 and a plurality of branch lines 18. Branch lines 18 are respectively connected to the bearings 12 and speed reducers 14, as shown. Connection between branch lines 18 and main trunk 16 is facilitated by a plurality of T-couplings 20.

As discussed above, prior art arrangements often utilized a dedicated transmission line for each sensor associated with a particular mechanical component. As the number of mechanical components increased, the number of total lines also increased on a proportionate basis. In the illustrated embodiment, however, more mechanical devices can be added to the system by simply providing additional branch lines 18. Thus, the illustrated construction allows information to be provided to processor 10 in a manner which is more convenient and efficient.

It should be appreciated that the principles of the described monitoring system is not limited to arrangements that utilize a "hard-wired" bus. For example, various arrangements may also be provided whereby the local transmitters provide status information to processor 10 via some form of telemetry, such as radio or infrared communication.

Figure 2:
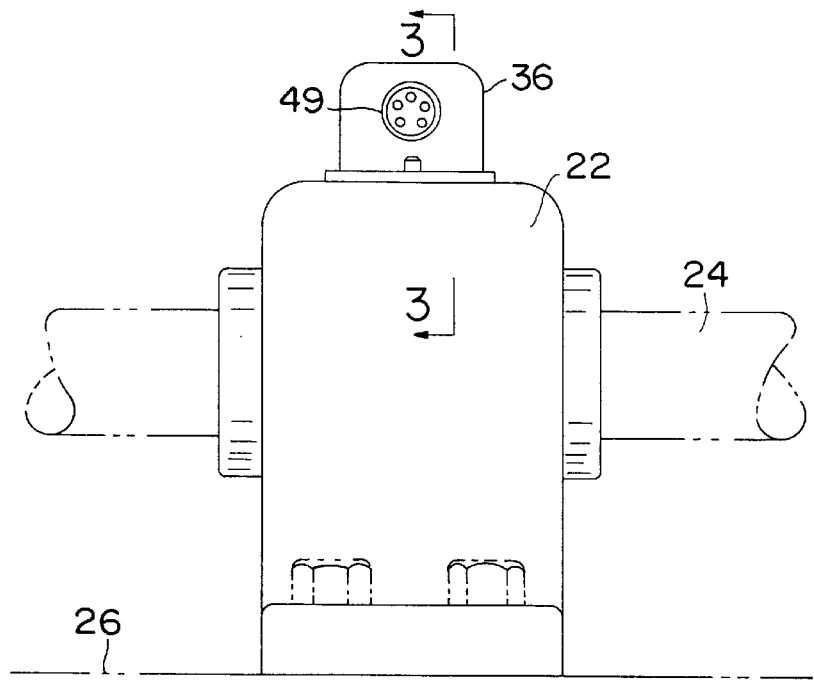
FIG. 2 is a side elevation of a bearing apparatus also utilized in the monitoring system of FIG. 1.
Figure 3:
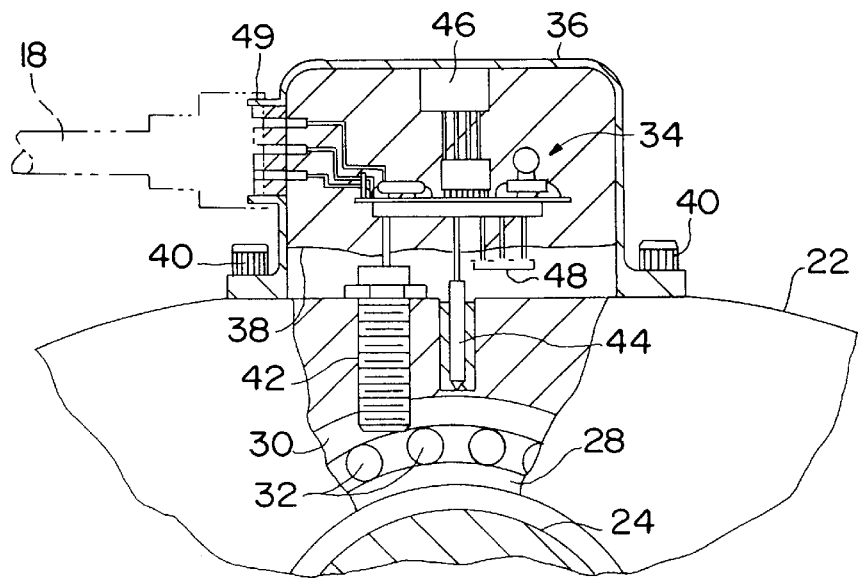
FIG. 3 is a partial cross sectional view as taken along line 3—3 of FIG. 2.

FIGS. 2 and 3 illustrate the construction of a bearing apparatus such as the bearings 12 of FIG. 1. As can be seen, the bearing apparatus includes a housing 22 having a bearing assembly therein for rotatably supporting a shaft 24. In this case, housing 22 is configured as a pillow block housing mounted to a stationary surface 26. It should be appreciated, however, that other suitable housing configurations, such as flange housings, may also be utilized.

Referring now particularly to FIG. 3, the bearing assembly located within housing 22 includes an annular inner ring 28 appropriately secured to shaft 24. Inner ring 28 defines an inner raceway about its outer circumferential surface. An annular outer ring 30 is further provided having an outer raceway situated in opposition to the inner raceway. A plurality of bearing elements, such as roller bearings 32, are disposed between the inner raceway and the outer raceway to facilitate relative rotation between rings 28 and 30. While roller bearings are illustrated, it should be appreciated that other suitable types of bearing elements, such as ball bearings, may also be utilized for this purpose.

Depending on the exigencies of a particular situation, various techniques may be utilized to effect securement of inner ring 28 to shaft 24. Among the arrangements which may be utilized for this purpose are various tapered adapter arrangements, set screw arrangements, eccentric collar clamping arrangements, and arrangements utilizing a slotted clamping collar situated about a plurality of clamping fingers.

The local transmitter may be constructed as a single printed circuit card 34 having various components mounted thereon. A cover 36, in this case a small housing, may be provided to protect card 34 during use. In some exemplary embodiments, card 34 is "potted" within cover 36 to provide an even greater degree of protection. In other words, card 34 may actually be embedded within an epoxy 38 or other suitable polymeric compound which fills the inner cavity of cover 36. Cover 36 may be attached to the exterior of housing 22 by bolts 40, or other suitable attachment means.

As can be seen in FIG. 3, the bearing apparatus in this case includes a speed sensor 42, a temperature sensor 44 and an accelerometer 46. Each of these sensors is preferably located within housing 22 or under cover 36 to provide a relatively compact arrangement, as shown. The sensors communicate with card 34 via respective signal lines extending therebetween. Depending on the requirements of a particular application, various other sensors may also be utilized, which communicate with card 34 via the respective signal lines collectively indicated at 48.

As shown, speed sensor 42 may be an inductive sensor operative to sense variations in its inductance produced during rotation of inner ring 28. In an exemplary construction, a nut or clamping collar used to secure inner ring 28 to shaft 24 may also function as a detection element from which sensor 42 can read.

As shown, temperature sensor 44 may be configured as a thermocouple sensor located within a receiving bore defined in housing 22. The construction of such a sensor is described in detail in U.S. Pat. No. 5,433,525, issued Jul. 18, 1995 to the present inventor, incorporated herein by reference.

In the illustrated embodiment, accelerometer 46 may be of a commercially available type constructed as a separate unit. This unit, like card 34, may be potted within cover 36 for protection. Accelerometer 46 contains a movable mass responsive to vibratory movement of housing 22 to produce an analogous output signal. As such, vibration of the bearing apparatus can be detected. One suitable accelerometer for this purpose is Model No. 327MII, marketed by IMI of Depew, N.Y.

As described above, circuitry located on card 34 receives sensor information and subsequently provides status information to the external processor. The status information may be transmitted in a serial digital format, in which portions of a digital word correspond to the respective sensors. In some embodiments, the status information may represent actual sensor information.

For example, consider a digital word sixty-four (64) bits in length. In this case, eight (8) bits may be respectively dedicated to information from each of speed sensor 42, temperature sensor 44 and accelerometer 46. The remainder of the word will be used for identification and communication protocol and checking of the transmission.

In other embodiments, the local transmitter may perform at least an initial analysis of the sensor information. In this case, the status information would represent a processed version of the sensor information. As an example, the local processor may perform an FFT on the sensor information to provide some form of diagnostic data to the central processor. Other suitable analysis techniques, such as trend line analysis, may also be utilized for this purpose.

Card 34 provides the digital word containing the status information to a local port 49. As shown, branch line 18 is connected to port 49, thus establishing electrical communication with processor 10. In the illustrated embodiment, port 49 is a five (5) pin port, corresponding to the five (5) lines comprising the overall bus. Preferably, port 49 is configured such that branch line 18 may be easily connected or disconnected as desired.

Figure 4:
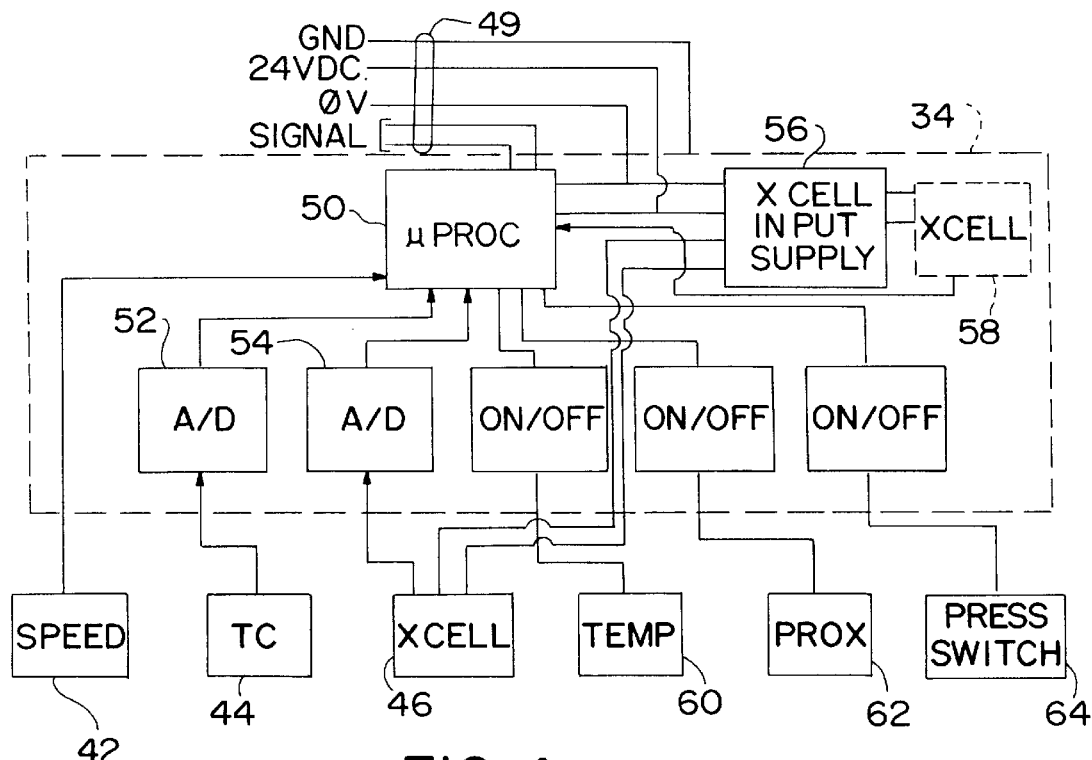
FIG. 4 is a diagrammatic representation illustrating a local transmitter connected to a variety of sensor devices.

As can be seen in FIG. 4, two of the five (5) lines in the bus serve to transmit signal information between card 34 and processor 10. Presently preferred embodiments utilize the controller area network (CAN) protocol for this purpose because it generally allows longer distance transmission than some other protocols, such as RS-232. Two other lines provide operating voltage for the circuit components, e.g, floating +24 VDC in the illustrated embodiment. The fifth line provides case grounding (GND).

Card 34 includes an on-board microprocessor 50 to recognize the external interrogation and provide the desired serial output. The output of some sensors, such as speed sensor 42, may be provided directly to microprocessor 50. For other sensors, it may be appropriate to provide a separate analog-to-digital (A/D) converter. For example, the outputs of temperature sensor 44 and accelerometer 46 are in this case provided to respective A/D converters 52 and 54. Converters 52 and 54, in turn, supply a representative digital output to microprocessor 50. It should be appreciated, however, that some suitable microprocessors may have one or more internal A/D converters.

Typical accelerometer devices, such as accelerometer 46, often utilize an external power supply circuit. In accordance with the present invention, this supply circuit may be mounted directly on card 34, as indicated at 56. In addition, the accelerometer itself may be mounted on card 34 in some alternative embodiments. Specifically, accelerometers have recently been developed which are incorporated into a microchip. Such a "micromachine" accelerometer is diagrammatically indicated at 58.

Other sensors which may be connected to microprocessor 50 provide an on/off output. In other words, the devices are configured to change state (from either a normally open or a normally closed state) when the parameter of interest exceeds a predetermined threshold. Examples of such sensors include temperature switch 60 and proximity switch 62. A preferred arrangement of temperature switch 60 is shown in U.S. Pat. No. 5,439,296, issued Aug. 8, 1995 to the present inventor and incorporated herein by reference.

Another sensor which provides an on/off signal is pressure switch 64. Generally, pressure switch 64 would not be utilized with a bearing, but may be incorporated into a speed reducer. Pressure switch 64 will function to detect when the pressure inside the reducer exceeds a predetermined value, which signals that the breather is plugged.

FIGS. 5 through 8 illustrate preferred constructions of speed reducers in accordance with the present invention.

Figure 5:
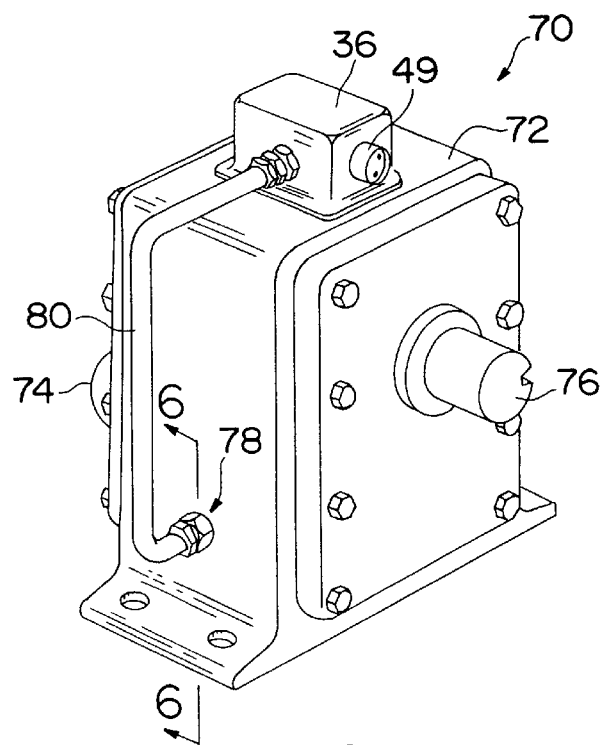
FIG. 5 is a perspective view of a first exemplary speed reducer constructed in accordance with the present invention.

Referring to FIG. 5, a speed reducer 70 is shown having a local transmitter mounted thereon. Speed reducer 70 includes a housing 72 rotatably supporting an input shaft 74 and an output shaft 76. As is well known, input shaft 74 and output shaft 76 are mechanically interconnected by various gears and the like within housing 72 to transfer mechanical power therebetween. Rotation of input shaft 74 by a source of mechanical power will thus cause a rotation of output shaft 76. The respective rotational speeds of shaft 74 and shaft 76 will be governed by a predetermined speed ratio.

Speed reducer 70 further includes a temperature sensing device 78 in communication with the local transmitter (having housing 36). In this case, the local transmitter is mounted on the top of housing 72, remotely from temperature sensing device 78. In such a configuration, the local transmitter may be mounted proximate other sensor devices, for example as illustrated above with respect to FIG. 3. Communication between the temperature sensing device 78 and the local transmitter is effected via communication lines located within conduit 80. In other embodiments, the local transmitter may be mounted proximate to temperature sensing device 78, in a manner similar to that illustrated in FIG. 3.

Figure 6:
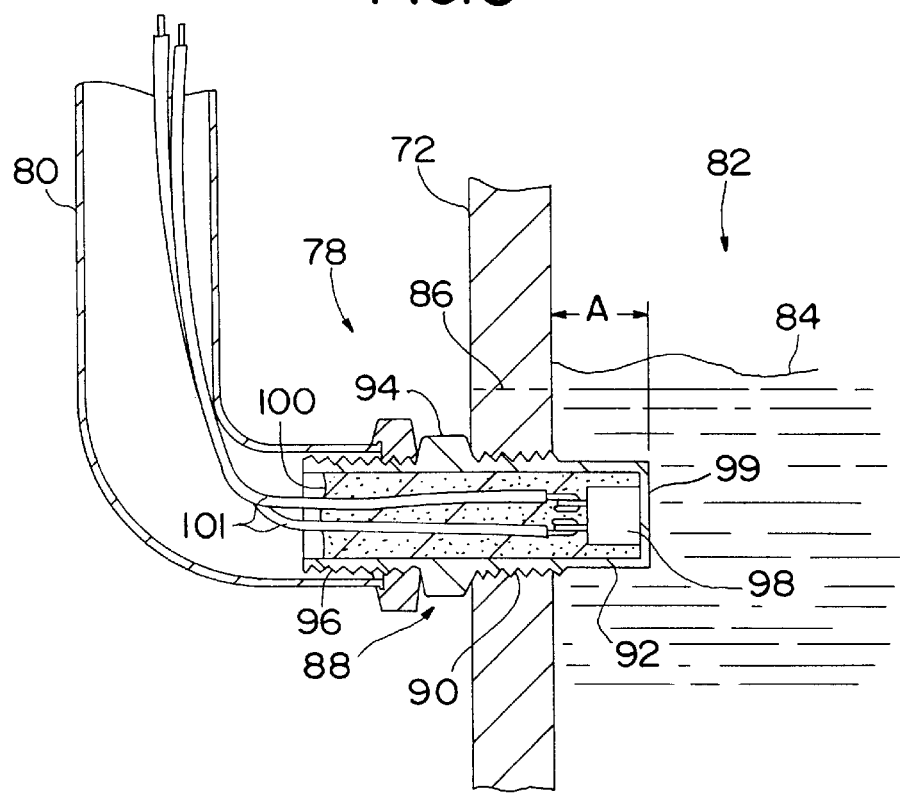
FIG. 6 is an enlarged partial cross-sectional view taken along line 6—6 showing a portion of the speed reducer shown in FIG. 5.

As can be seen most clearly in FIG. 6, housing 72 defines an interior area 82 containing a lubricant fluid 84 therein. Lubricant fluid 84 serves to lubricate the various internal mechanical components of speed reducer 70. Preferably, fluid 84 will remain at or above a predetermined minimum lubricant supply level, indicated at dashed line 86, when speed reducer 70 is in an upright position as shown in FIG. 5.

Temperature sensing device 78 includes a casing 88 threadably received in the wall of housing 72 as shown. In particular, casing 88 includes a first threaded portion 90 engaging complementary threads in the housing wall. An extension portion 92 extends into interior area 82 of housing 72 to a position defined by a predetermined distance A from the housing wall. An integral shoulder flange 94, configured on its outer surface as a nut, defines the limit to which the casing may be threaded through the housing wall, thereby determining the distance A. Casing 88 further includes a second threaded portion to facilitate attachment of conduit 80. Casing 88 is preferably constructed of a suitable material, such as copper or brass, that can withstand relatively high operating temperatures and which also has suitable thermal conduction properties.

In this case, temperature sensing device 78 includes a temperature switch 98 mounted within casing 88. Specifically, temperature switch 98 is mounted against the inner surface of a web portion 99 located at the end of extension portion 92. Preferably, switch 98 is maintained in position and protected by a heat resistant epoxy 100 substantially filling the entire interior cavity of casing 88. The thickness of web portion 99 should be relatively thin to allow easy thermal conduction to switch 98. In one embodiment, web portion 98 will have a thickness of approximately 1/16 inch.

Temperature switch 98 may be of the type including an internal bimetallic disc such as that discussed in the above-mentioned U.S. Pat. No. 5,429,296. Upon reaching a predetermined temperature, switch 98 will either open or close, depending on the type of switch used. As a result, an indication may be received at the local transmitter that lubricant fluid 84 has become too hot. Switch 98 is electrically connected to wires 101 which provide electrical communication the local transmitter in the manner described above.

Although other switch configurations may be utilized, the bimetallic disc arrangement of switch 98 is preferable because of its relative precision. For example, the disc will generally "snap" in a firm manner from its normal state to its alternate state when a predetermined temperature has been reached. Thus, the switch does not oscillate between the on and off states as the temperature nears the predetermined temperature.

It will also be appreciated that switch 98 is of a relatively small size, enabling effective operation without excessive intrusion into interior area 82. For example, in a preferred embodiment, the distance A is approximately 0.25 inch. Thus, temperature sensing device 84 may be installed at various positions on speed reducer 70 through housing 72 without danger of interference with the speed reducer's interior mechanical parts.

Figure 6A:
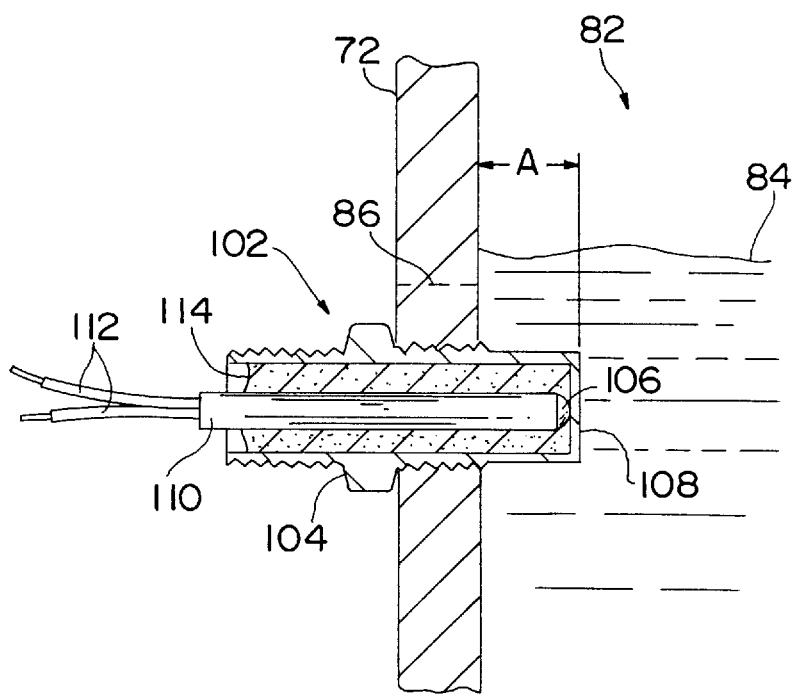
FIG. 6A is a view similar to FIG. 6 illustrating certain alternative features.

It should be understood that the temperature sensing device may comprise various configurations. For example, a thermocouple sensor as disclosed in the above-mentioned U.S. Pat. No. 5,433,525 may be used instead of switch 98. Referring now to FIG. 6A, a temperature sensor device 102 is illustrated having a casing 104 identical to casing 88 of temperature sensor device 78. In this case, a thermocouple is provided having a sensing tip 106 engaging the web portion 108 of casing 104. The thermocouple further includes a sheath 110 that protects the thermocouple wires 112. The interior of casing is filled with a suitable heat resistant epoxy 114 in the manner described above.

Figure 7:
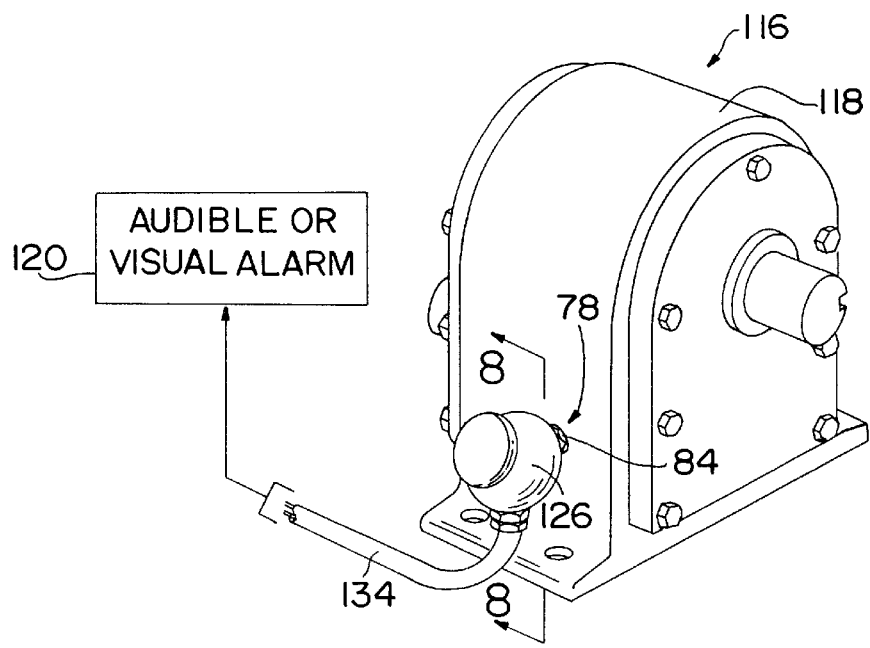
FIG. 7 is a perspective view of a second exemplary speed reducer constructed in accordance with the present invention.
Figure 8:
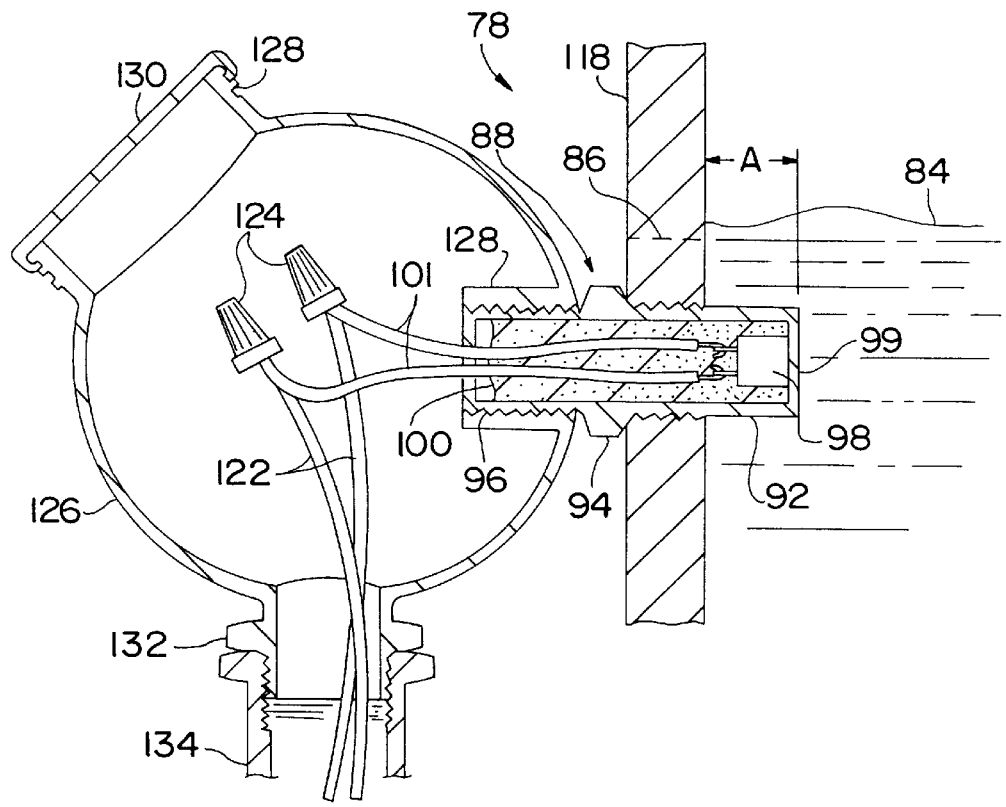
FIG. 8 is an enlarged partial cross-sectional view taken along line 8—8 showing a portion of the speed reducer shown in FIG. 7, illustrating certain alternative features.

FIGS. 7 and 8 illustrate temperature sensing device 78 in an alternative installation on speed reducer 116. Mechanically, speed reducer 116 may be similar to speed reducer 70 described above. The housing 118 of speed reducer 116 is shown to have a slightly different exterior shape merely to permit differentiation in the drawings.

In this embodiment, device 78 is being used to monitor the temperature of lubricant 84 so that an alarm 120 may be activated when the lubricant temperature reaches or exceeds a predetermined maximum, such as a temperature indicative of overheating. More specifically, switch 98 closes upon such occurrence, thereby causing wires 101 to communicate an alarm signal to a alarm device 120, which may be an audible or visual alarm.

In the illustrated embodiment, wires 101 are connected to secondary wires 122 via wire nuts 124. As shown, a junction box 126 is provided for this purpose. Junction box 126 includes an interior-threaded portion 128 for engaging the second threaded portion 96 of casing 88. In addition, junction box 126 further defines an access mouth having exterior threads 128. A lid 130 is provided engaging threads 128 to permit easy access to the interior of the junction box 126 for connecting or disconnection the wires. A depending threaded portion 132 permits attachment of conduit 134.

While preferred embodiments of the invention have been shown and described, it will be appreciated that modifications and variations may be made thereto by those of ordinary skill in the art without departing from the spirit and scope of the present invention. For example, the term "mechanical components" as used herein can include a variety of mechanical and electromechanical devices, including motors. It will be further appreciated that aspects of the various embodiments may be interchanged both in whole or in part. Additionally, those of ordinary skill in the art will appreciate that the foregoing description is by way of example only, and is not intended to be limitative of the invention so further described in such appended claims.

What is claimed is:

1. An improved speed reducer and monitoring system, said system comprising in combination:

an open network monitoring and control circuit configured to receive and to monitor data from a plurality of separate, remote devices;

a plurality of separate devices independently coupled to said monitoring and control circuit and configured to transmit data to said monitoring and control circuit from separate locations in a machine system, said devices including at least one speed reducer comprising:

a housing rotatably supporting an input shaft and an output shaft mechanically interconnected to transfer mechanical power therebetween, said housing defining an interior area for containing a lubricant fluid to at least a minimum lubricant supply level when said speed reducer is in an upright position;

a temperature sensing device supported by said housing and extending at least partially into said interior area to a predetermined location, the predetermined location being below said minimum lubricant supply level, said temperature sensing device being responsive to temperature of the lubricant fluid and configured to generate a temperature signal representative thereof; and an interface circuit local to said housing, the interface circuit being coupled to the temperature sensing device and to said monitoring and control circuit, the interface circuit converting the temperature signal to an output signal in accordance with a predetermined communications protocol for communication to the monitoring and control circuit in coordination with data from other of said separate devices.

2. The improved speed reducer and monitoring system as in claim 1, wherein said temperature sensing device is configured to detect when the lubricant fluid reaches a predetermined temperature and wherein said information is indicative of such occurrence.

3. The improved speed reducer and monitoring system as in claim 2, wherein said temperature sensing device includes a switch responsive to the temperature of the lubricant fluid in said interior area so that said switch is activated when the lubricant fluid reaches the predetermined temperature.

4. The improved speed reducer and monitoring system as in claim 1, wherein said temperature sensing device includes a casing extending through said housing in sealing engagement with said housing.

5. The improved speed reducer and monitoring system as in claim 4, wherein said temperature sensing device includes a temperature switch mounted at a predetermined temperature sensing location within said casing.

6. The improved speed reducer and monitoring system as in claim 4, wherein said temperature sensing device includes a thermocouple having a sensing tip mounted at a predetermined temperature sensing location within said casing.

7. The improved speed reducer and monitoring system as in claim 4, including a junction box connectible to said casing outside said housing for receiving said at least one communication line for connection to said monitoring and control circuit.

8. The improved speed reducer and monitoring system as in claim 1, wherein said monitoring and control circuit includes an audible alarm.

9. The improved speed reducer and monitoring system as in claim 1, wherein said monitoring and control circuit includes a visual alarm.

10. An improved speed reducer system, said speed reducer system comprising:

a control and monitoring network configured for coupling to a plurality of monitored devices at separate locations; and a networkable gear reducer unit interfaceable with said network independently of other of said plurality of monitored devices, said gear reducer unit comprising:

a housing rotatably supporting an input shaft and an output shaft mechanically interconnected to transfer mechanical power therebetween, said housing defining an interior area for containing a lubricant fluid to at least a minimum lubricant supply level when said speed reducer is in an upright position; and a plurality of sensors, including temperature sensing device, electrically connectible to said network, said temperature sensing device including:

casing in sealing engagement with said housing and extending through said housing into said interior area to a predetermined location, the predetermined location being below said minimum lubricant supply level, and a temperature sensing element mounted within said casing and responsive to the temperature of the lubricant fluid in said interior area, said temperature sensing element configured to generate a temperature signal indicative of the temperature of said lubricant fluid; and said speed reducer unit further comprising a data collection and transmission circuit supported by said housing to form a modular networkable unit, said data collection and transmission circuit being coupled to said temperature sensing element and configured to receive said temperature signal and to transmit said temperature signal to a monitoring and control circuit via said control and monitoring network.

11. The improved speed reducer system as in claim 10, wherein said temperature sensing element is a switch.

12. The improved speed reducer system as in claim 10, wherein said temperature sensing element is a thermocouple.

13. The improved speed reducer system as in claim 10, wherein said monitoring and control circuit includes an audible alarm.

14. The improved speed reducer system as in claim 10, wherein said monitoring and control circuit includes a visual alarm.

15. An improved speed reducer system, said speed reducer system comprising:

a plurality of separate, networkable speed reducer units, each speed reducer unit including:

a housing rotatably supporting an input shaft and an output shaft mechanically interconnected to transfer mechanical power therebetween, said housing defining an interior area for containing a lubricant fluid to at least a minimum lubricant supply level when said speed reducer is in an upright position;

a temperature sensing device supported by said housing and extending at least partially into said interior area to a predetermined location, the predetermined location being below said minimum lubricant supply level, said temperature sensing device being responsive to temperature of the lubricant fluid; and a local transmitter supported on said housing to form a networkable unit interfaceable with a monitoring and control circuit independently of local transmitters of other of said plurality of speed reducer units, said local transmitter having an output port, said local transmitter being in electrical communication with at least said temperature sensing device to receive information at least indicative of the temperature of the lubricant fluid and subsequently providing status information at said output port in a predetermined format, wherein the status information at least in part corresponds to the temperature information;

said system further comprising a monitoring and control circuit coupled to the plurality of speed reducer units via a communications network, the monitoring and control circuit configured to receive and process status information from the plurality of speed reducer units.

16. The improved speed reducer system as in claim 15, wherein said temperature sensing device of at least one speed reducer unit is configured to detect when the lubricant fluid reaches a predetermined temperature and wherein the temperature information is indicative of such occurrence.

17. The improved speed reducer system as in claim 16, wherein said temperature sensing device of at least one speed reducer unit includes a switch responsive to the temperature of the lubricant fluid in said interior are of the respective speed reducer so that said switch is activated when the lubricant fluid reaches the predetermined temperature.

18. The improved speed reducer system as in claim 15, wherein said temperature sensing device of at least one speed reducer unit includes one of a thermocouple and a temperature switch.

19. The improved speed reducer system as in claim 16, wherein said local transmitter of each speed reducer unit has a unique electronic identifier associated therewith to facilitate communication with the monitoring and control circuit.

20. The improved speed reducer system as in claim 19, wherein said local transmitter of at least one speed reducer unit is configured to supply the status information from said output port via a serial digital format.

21. The improved speed reducer system as in claim 19, wherein said local transmitter of at least one speed reducer unit is configured to analyze the temperature information and provide processed data within the status information.

* * * * *